L. D. WYLDE.
ANIMAL HOPPLE.
APPLICATION FILED JULY 11, 1916.
1,301,349.
Patented Apr. 22, 1919.
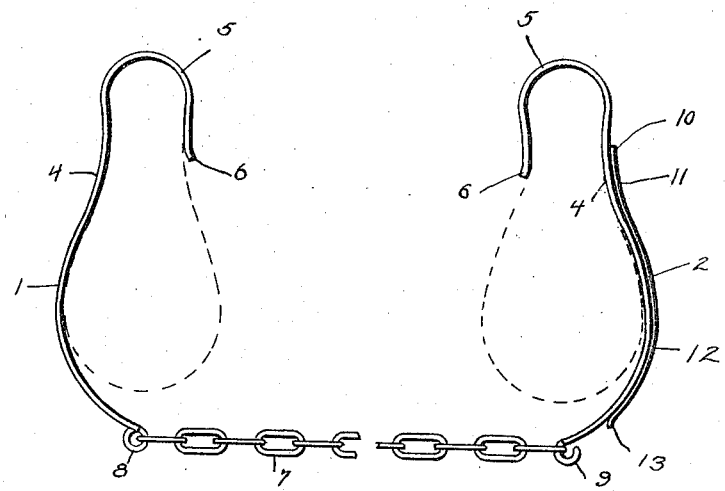
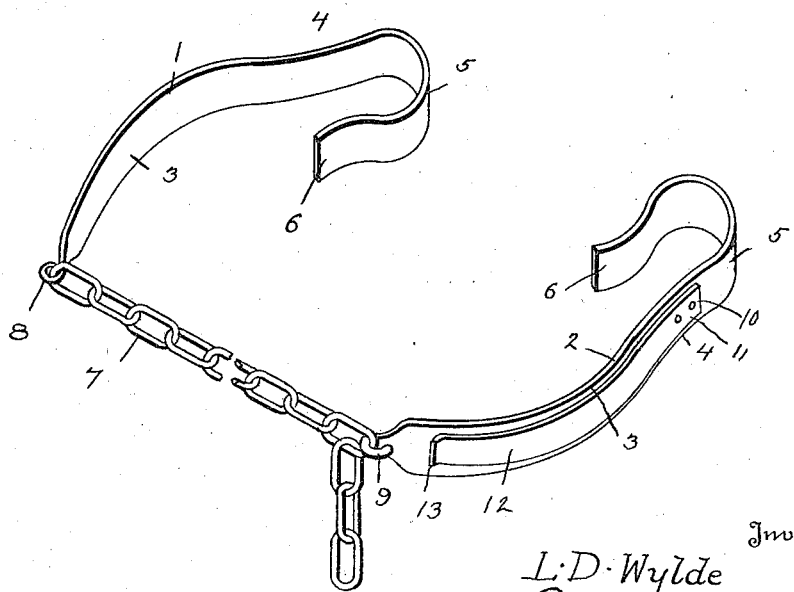

UNITED STATES PATENT OFFICE.

LEWIS D. WYLDE, OF TURLOCK, CALIFORNIA.

ANIMAL-HOPPLE.

1,301,349.　　　Specification of Letters Patent.　　Patented Apr. 22, 1919.

Application filed July 11, 1916.　Serial No. 108,604.

*To all whom it may concern:*

Be it known that I, LEWIS D. WYLDE, a citizen of the United States, residing at Turlock, in the county of Stanislaus and State of California, have invented certain new and useful Improvements in Animal-Hopples; and I do hereby declare the following to be a full, clear, and exact description of the invention, such as will enable others skilled in the art to which it appertains to make and use the same.

This invention relates to improvements in animal hopples, particularly of the type designed to be employed on a cow to prevent the cow from kicking during milking, and which consists of a companion pair of leg-engaging members having suitable connection with each other, the object of the invention being to admit of the leg-engaging member being conveniently positioned on or removed from operative position and so constructed that the connecting means for the leg-engaging members will be held spaced from the legs of a cow so as to prevent chafing of the flesh of the animal.

Other objects will appear and be better understood from that embodiment of my invention of which the following is a specification, reference being had to the accompanying drawings forming a part thereof, in which:

Figure 1 is a plan view of the hopple, showing the same applied in operative position, and Fig. 2 is a perspective view of the hopple detached from operative position.

Referring to the drawings in detail, the numerals 1 and 2 designate the companion leg-engaging members each formed of a strip of metal, and having its major portion or arm curved into arcuate shape, as shown at 3, and having one end continued from the arcuate shaped portion 3 and bent inwardly, as shown at 4, and then continued from the inwardly bent portion 4 to provide the tendon-engaging loop 5, the free terminal of the loop 5 being deflected outwardly, as shown at 6. When the members 1 and 2 are in operative position, the inner ends thereof are projected beyond the inner side of the legs, as shown in Fig. 1, and are detachably connected to each other by means of a chain 7. This chain 7 has one end connected to a closed eye 8 carried by the forward or inner end of the member 1 and the said chain is adapted to have the links thereof interchangeably engaged by an open eye 9 carried by the inner end of the companion leg-engaging member 2. By virtue of the fact that the inner ends of the members 1 and 2 extend beyond the inner sides of the legs of a cow, the said ends can be flexed, owing to the resiliency of the metal during any movement of the legs of the cow so as to prevent any undue strain being exerted on the legs. This extension of the inner ends of the members 1 and 2 will also hold the chain 7 sufficiently spaced from the legs of the cow and prevent the chain doing injury to the legs during movement of the latter.

The eyes 8 and 9 are formed by reducing the inner or connected ends of the members 1 and 2 and then bending the same to the desired configuration.

Associated with the leg-engaging member 2 is a tail-holding clip 10. This tail holding clip is located on the outer side of the member 2 and is bent into a shape to conform with the configuration of the member 2, having the inwardly depressed portion 11 located opposite the inwardly depressed portion 4 on the member 2, and having one end free and bent into arcuate shape, as shown at 12, so as to agree with the arcuate shaped portion 3 of the member 2, the free terminal of the clip being deflected outwardly, as shown at 13, to provide means by which the clip 10 can be moved away from the member 2 to admit of the positioning of the tail between the member 10 and the leg-engaging member 2.

By virtue of the fact that the chain 7 will be located in spaced relation with the adjacent inner surface of the legs of the animal, as shown in Fig. 1, abrasion of the flesh of the animal by the chain will be prevented.

Having thus described my invention what I claim as new is:

An animal hopple comprising a pair of leg engaging members, each member consisting of an arm of compound curvature provided at its rear end with a tendon embracing loop and at its front end with an eye, and a chain connected to the eyes, said arms being of considerable length to space their front portions beyond the front sides of the animal's legs when the hopple is in use, and said portions of the arms preventing the chain from engaging and chafing the animal's legs.

In testimony whereof I affix my signature in presence of two witnesses.

LEWIS D. WYLDE.

Witnesses:
R. J. JOHANN,
A. W. CALDWELL.

Copies of this patent may be obtained for five cents each, by addressing the "Commissioner of Patents, Washington, D. C."